(12) United States Patent
Rupiper et al.

(10) Patent No.: US 6,886,677 B2
(45) Date of Patent: May 3, 2005

(54) INTERLOCK OF PARKING BRAKE AND DRIVE CONTROL PEDALS FOR UTILITY VEHICLE

(75) Inventors: Christopher Lee Rupiper, Lomira, WI (US); John Franklin Ferree, Beaver Dam, WI (US); Michael Charles Lee, Beaver Dam, WI (US)

(73) Assignee: Deere & Co., Moline, IL (US)

( * ) Notice: Subject to any disclaimer, the term of this patent is extended or adjusted under 35 U.S.C. 154(b) by 3 days.

(21) Appl. No.: 10/273,516

(22) Filed: Oct. 18, 2002

(65) Prior Publication Data

US 2004/0074692 A1 Apr. 22, 2004

(51) Int. Cl.$^7$ .............................................. B60K 41/26
(52) U.S. Cl. ................................ 192/219.6; 192/220.1; 74/473.17; 74/483 R; 180/336
(58) Field of Search ......................... 192/219.4, 219.6, 192/220.1; 74/473.17, 473.21, 473.25, 483 R; 180/307, 336

(56) References Cited

U.S. PATENT DOCUMENTS

| | | |
|---|---|---|
| 4,037,487 A | 7/1977 | Ahlschwede et al. |
| 4,037,695 A | 7/1977 | Welck |
| 4,248,331 A | 2/1981 | Behrens |
| 4,298,108 A | 11/1981 | Hutchinson |
| 4,491,209 A | 1/1985 | Bening |
| 4,539,863 A | 9/1985 | Kaukaskie |
| 4,671,395 A | 6/1987 | Dobberpuhl et al. |
| 4,781,259 A | 11/1988 | Yamaoka et al. |
| 4,958,535 A | 9/1990 | Swartzendruber |
| 4,969,533 A | 11/1990 | Holm et al. |
| 5,022,477 A * | 6/1991 | Wanie ........................ 180/6.34 |
| 5,048,638 A * | 9/1991 | Duncan et al. .............. 180/307 |
| 5,062,510 A * | 11/1991 | Shimizu .................... 192/220.1 |
| 5,094,077 A | 3/1992 | Okada |
| 5,136,899 A | 8/1992 | Hoch et al. |
| 5,142,940 A | 9/1992 | Hasegawa |
| 5,152,382 A | 10/1992 | Hoch et al. |
| 5,323,890 A | 6/1994 | Okada |
| RE34,833 E | 1/1995 | Hasegawa et al. |
| 5,427,216 A * | 6/1995 | Hoch ........................ 192/220.1 |
| 5,456,068 A | 10/1995 | Ishii et al. |
| 6,237,711 B1 * | 5/2001 | Hunt ........................... 180/336 |
| 6,279,937 B1 | 8/2001 | Hunt |
| 6,484,827 B2 * | 11/2002 | Teal et al. .................... 180/6.2 |

\* cited by examiner

Primary Examiner—Richard M. Lorence
(74) Attorney, Agent, or Firm—The Law Office of Randall T. Erickson, P.C.

(57) ABSTRACT

In a vehicle, such as a lawn and garden tractor, having an engine that drives a hydrostatic transmission and having forward and reverse pedals that control the hydrostatic transmission, an operator-actuated transmission locking mechanism locks the forward and reverse pedals in a neutral position. The vehicle includes a parking brake that has a manually set portion to cause engagement of the parking brake. The transmission locking mechanism is mechanically connected to the manually set portion such that the manually set portion and the transmission locking mechanism are actuated together.

10 Claims, 6 Drawing Sheets

INTERLOCK OF PARKING BRAKE AND DRIVE CONTROL PEDALS FOR UTILITY VEHICLE

TECHNICAL FIELD OF THE INVENTION

The invention relates to utility vehicles or off-road vehicles, such as lawn and garden tractors. Particularly, the invention relates to an improved parking brake mechanism for such vehicles.

BACKGROUND OF THE INVENTION

It is well-known to provide off-road vehicles, such as lawn tractors, lawn and garden tractors, and front-mount mowers, with systems for controlling ground speed, including a parking brake mechanism. Typically, variable speed transmissions, such as hydrostatic transmissions or continuously variable transmissions, are utilized in off-road vehicles, such as those listed above. Typically, forward and reverse foot pedals are used with such transmissions to select the direction of travel and to control the relative vehicle speed. The pedal system can also be coupled with a hand-operated "cruise control" lever which is generally used to maintain a specified forward speed, eliminating the need for constant application of foot pressure to keep the vehicle moving forward at a desired rate of speed.

A pedal brake is typically used in such off-road vehicles. The pedal brake actuates a disc brake assembly within the vehicle transmission casing. A parking brake mechanism is operatively associated with the pedal brake. The parking brake mechanism includes a hand-operated linkage which locks the disc brake in its fully engaged position.

Off-road vehicles are also commonly provided with a neutral return mechanism which will place the transmission in neutral, or stated otherwise, will disengage the transmission, when the brake is applied. Such a system is disclosed for example in U.S. Pat. No. 6,279,937.

However, such systems can suffer from the drawback that, although the system returns the forward and reverse foot pedals to neutral upon brake application, the system allows the pedals to be depressed when the parking brake is engaged. In some cases, the system allows an operator to partially engage the hydrostatic transmission when the parking brake is engaged. Such a situation can cause excessive wear on the brake.

The present inventors have recognized the desirability of providing a vehicle ground speed and direction control assembly wherein an actuation of the parking brake would preclude the simultaneous engagement into drive, forward or reverse, of the vehicle hydrostatic transmission.

SUMMARY OF THE INVENTION

For a utility vehicle, such as a lawn and garden tractor, having an engine that drives a hydrostatic transmission and having forward and reverse pedals that control the hydrostatic transmission, the invention includes an operator-actuated transmission locking mechanism that locks the forward and reverse pedals in a neutral position. The invention provides a mechanism that selectively prevents engagement of the hydrostatic transmission of the vehicle when such engagement would be detrimental to the vehicle.

Preferably, the vehicle includes a parking brake mechanism that has a manually set portion to cause engagement of the parking brake. The transmission locking mechanism is mechanically connected to the manually set portion such that the manually set portion and the transmission locking mechanism are actuated together.

An advantage to this configuration is that two settings can be made with one action by the operator. When the operator actuates the parking brake mechanism, the operator locks the brake and locks the transmission forward and reverse pedals in the neutral position to ensure effective disengagement of the transmission. Thus, an operator would be prevented from partially or completely engaging the hydrostatic transmission into drive, in forward or reverse, while the parking brake was engaged. Excessive wear on the parking brake is prevented.

According to an exemplary embodiment, the vehicle comprises a brake pedal and a moving portion actuated by an operator's foot pressing the brake pedal, the moving portion movable from a brake-disengaged position to a brake-engaged position. The manually set portion comprises an engagement member having a pivoting end and a catch portion spaced from the pivoting end, wherein when the moving portion is in the brake-engaged position the engagement member pivots to engage the catch portion with the moving portion to prevent retraction of the moving portion to the brake-disengaged position.

The forward and reverse pedals are operatively connected to a pedal control arm such that the pedal control arm is pivoted one direction by movement of the forward pedal and in an opposite, second direction by movement of the reverse pedal. The pedal control arm comprises a protrusion, and the transmission locking mechanism, when actuated by the operator, is engageable to the protrusion to arrest movement of the pedal control arm.

Preferably, the transmission locking mechanism is mounted on the engagement member of the manually set portion and is engaged to the protrusion simultaneously with the engagement of the catch portion with the moving portion.

According to an exemplary embodiment of the invention, a vehicle includes a vehicle frame supported on a plurality of wheels. An engine drives a hydrostatic transmission; the engine and transmission are supported on the frame. The transmission is operatively connected to at least one of the wheels to drive the one wheel, to drive the vehicle. An operator-actuated brake pedal is operatively connected via a first moving part to at least one vehicle brake to engage the brake or to disengage the brake. Operator-actuated forward and reverse pedals are operatively connected via a second moving part to the hydrostatic transmission to control the hydrostatic transmission to selectively drive the vehicle in forward or reverse. An operator-actuated parking brake actuator is movable between a park mode and a release mode. The parking brake actuator is operatively connected to a third moving part that moves to arrest movement of the first and second moving parts when the actuator is moved from the release mode to the park mode.

Preferably, the first moving part comprises a first member that swings with an actuation of the brake pedal, the first member having a first protrusion on a swinging portion of the first member. The second moving part comprises a second member that swings in a first direction with an actuation of the forward pedal and in a second direction with an actuation of the reverse pedal, the second member having a second protrusion on a swinging portion thereof. The third moving part comprises a latch arm having first and second slots, the latch arm configured to pivot upon actuation of the parking brake actuator causing the latch arm to swing with the first slot capturing the first protrusion and the second slot capturing the second protrusion, to arrest movement of the first and second members.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
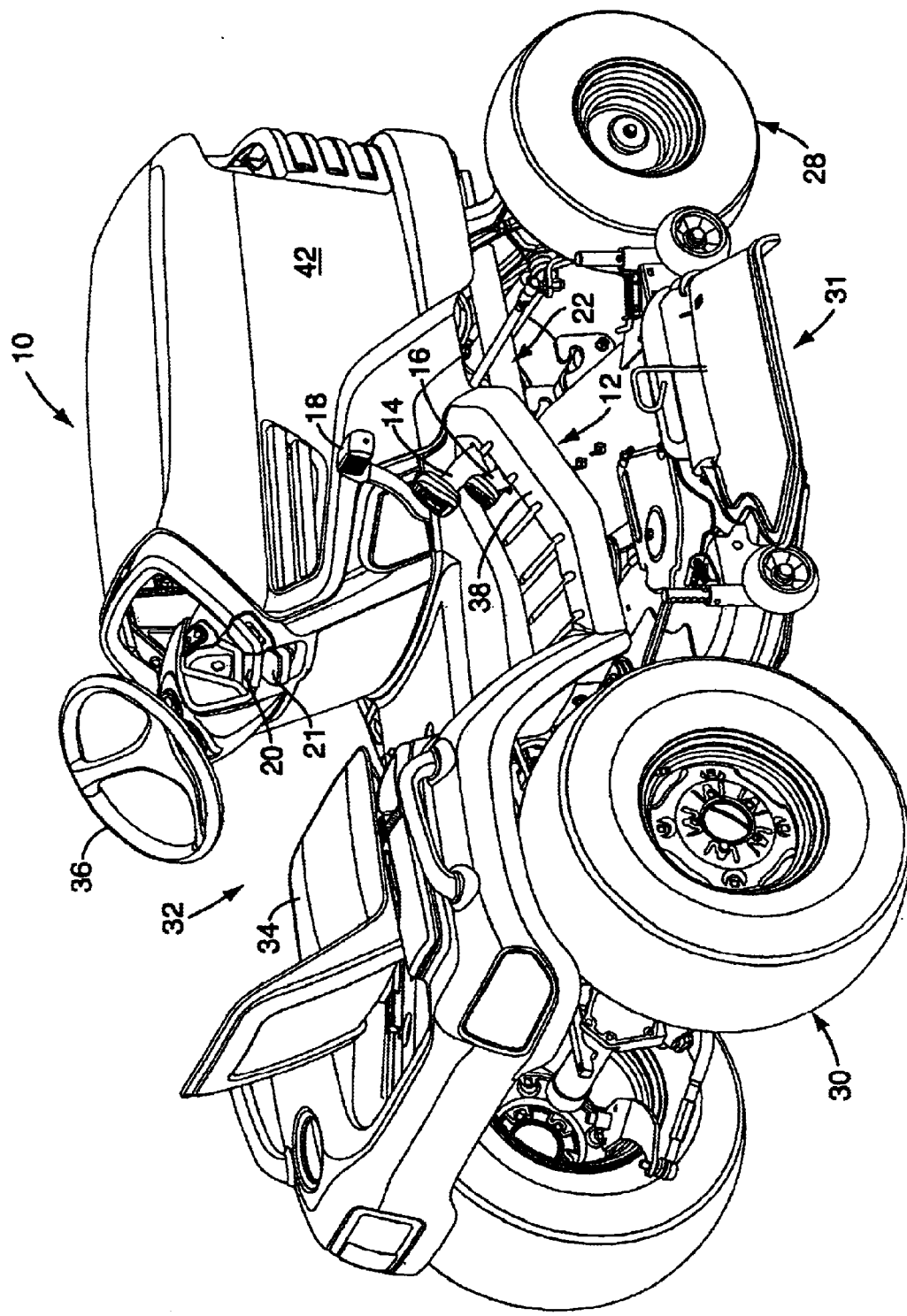
FIG. 1 is a perspective view of a lawn and garden tractor incorporating the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle or off-road vehicle in the form of a lawn and garden tractor 10. The invention sets forth improvements for lawn and garden tractors such as for JOHN DEERE lawn and garden tractors, model numbers 425, 445 or 455.

The tractor 10 incorporates a linkage forming a ground speed and direction control assembly 12 which includes an inboard forward pedal 14, an outboard reverse pedal 16, a brake pedal 18, a cruise control handle 20, and a parking brake handle 21.

As shown in FIG. 1, the tractor 10 includes a frame 22, and two front wheels 28 and two rear wheels 30 carried by the frame. The tractor 10 may be provided with an implement such as a mowing deck 31 which may be mounted on the frame 22. An operator station 32 which includes a seat 34, a steering wheel 36 and the hand-operated levers 20, 21 is operatively positioned on the vehicle 10. A forward portion of the operator station 32 includes a foot platform 38 which accommodates foot controls including the forward and reverse pedals 14, 16 and the brake pedal 18.

Figure 2:
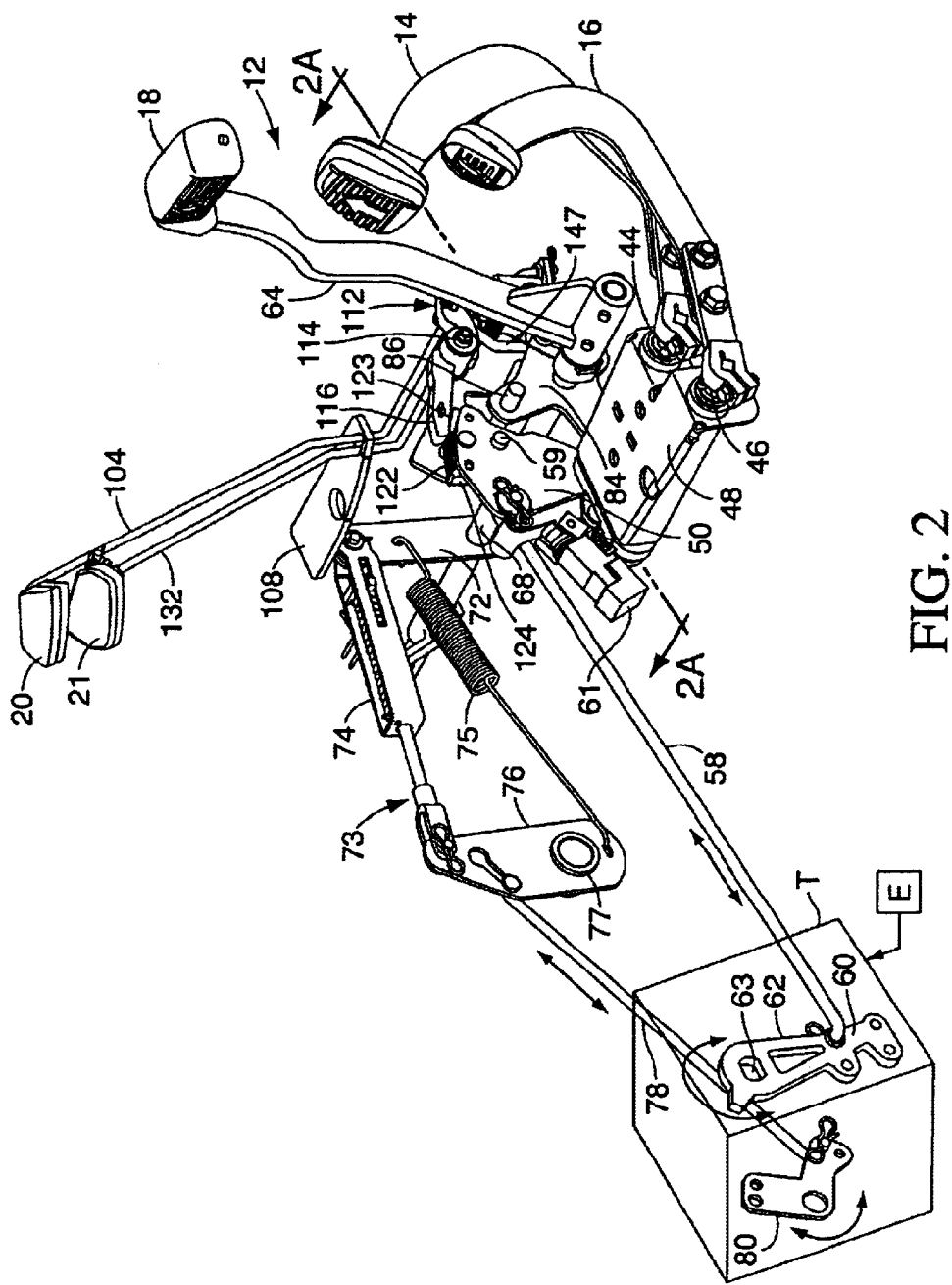
FIG. 2 is a partially schematic right side perspective view of a ground speed and direction control assembly of the lawn and garden tractor of FIG. 1 that incorporates the present invention, shown with the cruise control engaged and the parking brake disengaged.

The speed and direction control assembly 12 is operatively connected to a variable speed transmission which includes a hydrostatic transmission T, shown schematically in FIG. 2. The typical lawn and garden tractor 10 also includes an engine E (shown schematically in FIG. 2) and a radiator (not shown), enclosed within a hood 42.

Figure 2A:
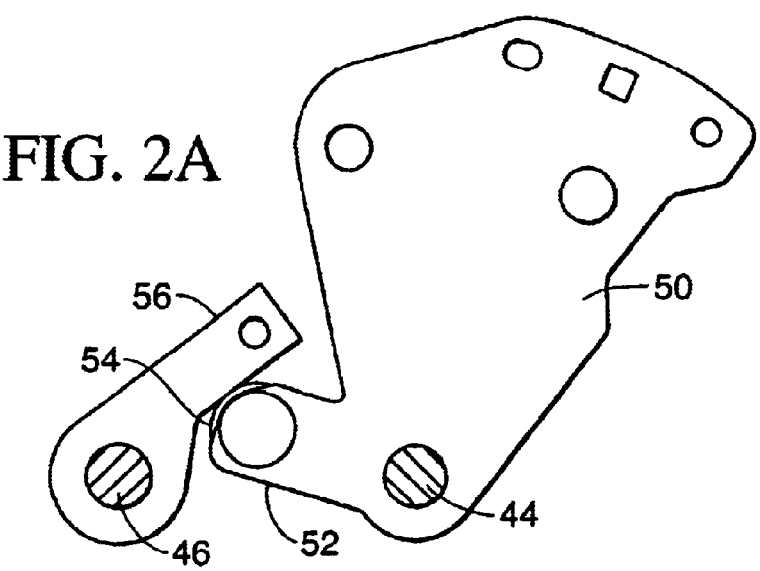
FIG. 2A is a sectional view taken generally along line 2A—2A in FIG. 2 of a portion of the assembly shown in FIG. 2 with portions removed for clarity.
Figure 3A:
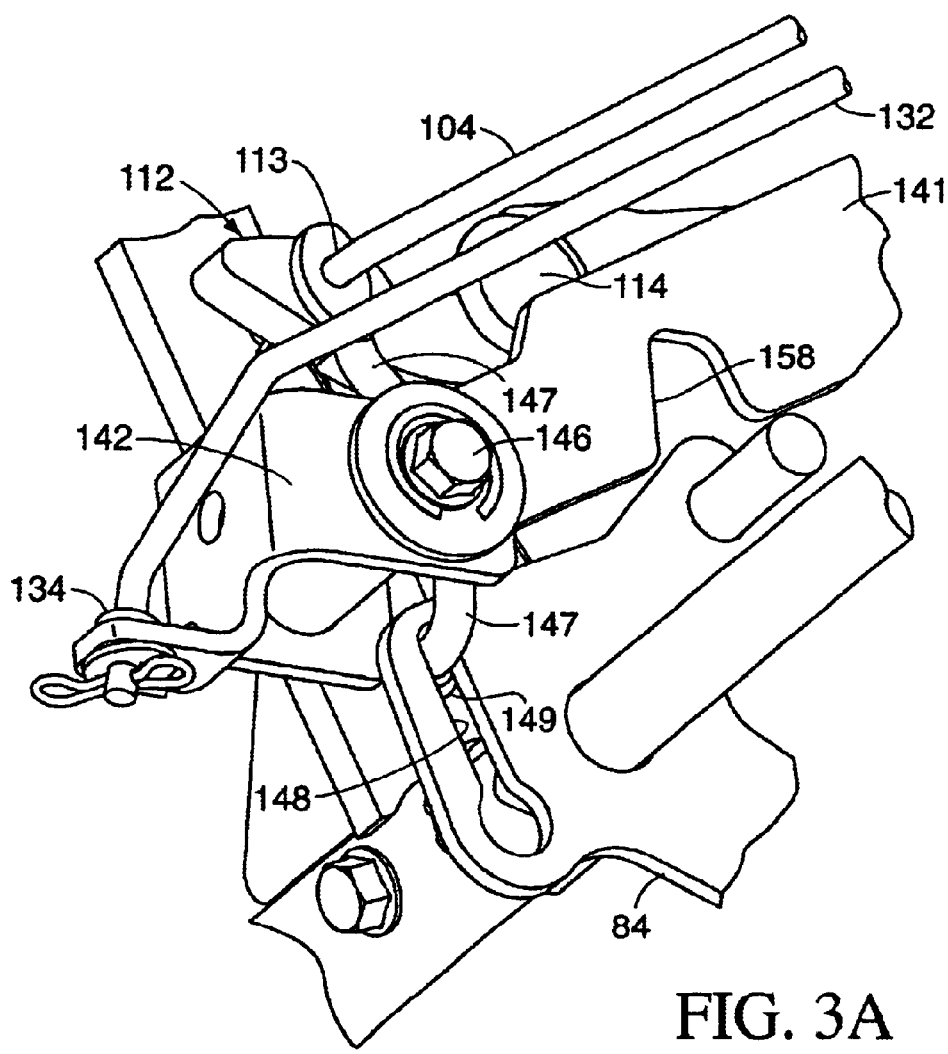
FIG. 3A is an enlarged, fragmentary left side perspective view taken from FIG. 3.
Figure 3:
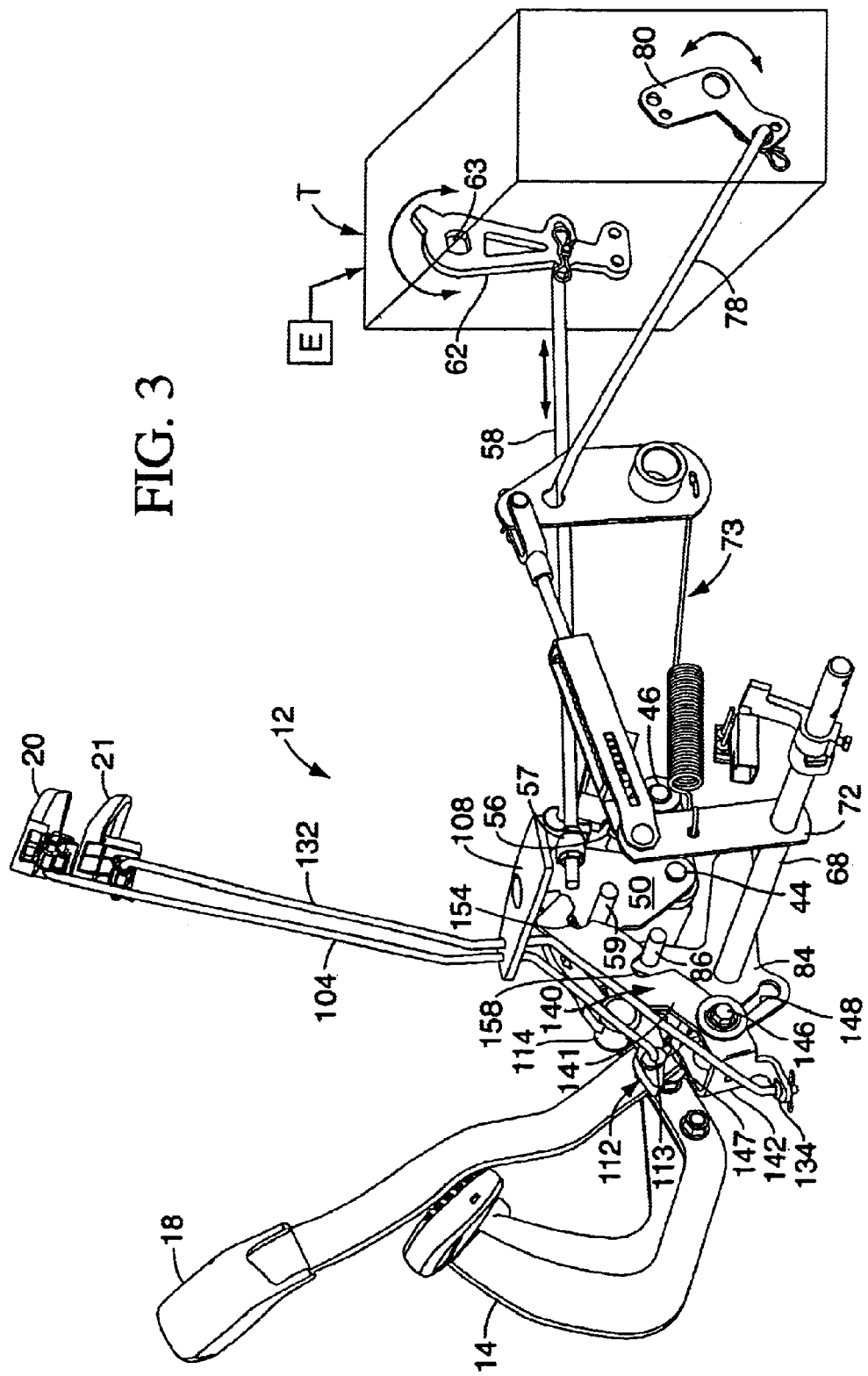
FIG. 3 is a left side partially schematic perspective view of the assembly of FIG. 2.

FIGS. 2 and 3 illustrate the improved ground speed and direction control assembly 12 for the tractor 10. FIGS. 2 and 3 illustrate the assembly 12 in the neutral drive position with the parking brake disengaged and the cruise control engaged. The forward pedal 14 is clamped to a forward pedal shaft 44 so that forward pressure by an operator's foot on the forward pedal 14 result in axial rotation of the forward pedal shaft 44. The reverse pedal 16 is similarly clamped to a reverse pedal shaft 46. The forward and reverse pedal shafts 44, 46 are carried by a bracket 48. The forward pedal shaft 44 is connected to a pedal control arm 50 which swings therewith and includes a rearward extension 52 to which a bearing 54 is mounted (shown in FIG. 2A).

As shown in FIG. 2A, the reverse pedal shaft 46 is fixed to a reverse pedal shaft arm 56 which swings with the reverse pedal shaft 46 and engages the bearing 54 to cause the control arm 50 to rotate in a direction opposite to direction of rotation which is caused by actuation of the forward pedal 14.

The control arm 50 is connected at a ball joint 57 (FIG. 3) to a forward/reverse transmission control rod 58. By pivoting in a selected direction, the control arm 50 can move the forward/reverse transmission control rod 58 in either a forward or reverse direction. The arm 50 will pull forward on the rod 58 when the forward pedal 14 is actuated and will push rearward on the rod 58 when the reverse pedal 16 is actuated. The rod 58 is connected at a pin joint 60 to a transmission control lever 62. By movement of the rod 58, the transmission control lever 62 pivots about a connection 63 to the transmission T. Pivoting of the control lever 62 in a selected direction causes the swashplate (not shown) to tilt in either a forward drive position or a reverse drive position. Such an arrangement is described in more detail in U.S. Pat. Nos. 5,046,994; 5,323,890; and 5,142,940, all herein incorporated by reference.

Returning to FIGS. 2 and 3, the control arm 50 includes a short rod 59 which passes through the control arm 50 to form a protrusion on a left side of the control arm 50 (as shown in FIG. 3). A contact switch 61 is positioned rearward of the control arm 50. When the control arm 50 pivots rearward, under control of the reverse pedal 16, the switch 61 is triggered by contact from the control arm 50. The switch 61 sends a signal to vehicle controls to shut off power to the power takeoff which prevents an implement, such as the mower deck 31, from running while the tractor is moving in reverse.

The brake pedal 18 includes a brake arm 64 that is fixed to a brake shaft 68. Pressing the brake pedal 18 forwardly pivots the brake arm 64 and axially rotates the brake shaft 68. A brake lever 72 is fixed to the brake shaft 68 such that rotation of the brake shaft 68 swings the brake lever 72 which in turn pulls a brake linkage assembly 73. The linkage assembly 73 includes a force-limiting spring 74 and a return spring 75, both fixed to an intermediate plate 76. The intermediate plate 76 is pivoted with respect to the vehicle frame at a bushing 77 and connected to a brake rod 78. The brake rod 78 is connected to a transmission brake lever 80, the rotation of which actuates a disc brake arrangement (not shown) within the transmission T. The disc brake arrangement is a vehicle brake internal to the hydrostatic transmission and can be of the type currently used in JOHN DEERE lawn and garden tractors, model numbers 425, 445 or 455, or as described in U.S. Pat. Nos. 5,046,994; 5,323,890; or 5,142,940, all herein incorporated by reference.

When the brake pedal 18 is depressed by the operator, the brake shaft 68 is rotated, and the arm 72 swings. The force-limiting spring 74 is displaced forwardly as the intermediate plate 76 pivots about the bushing 77, and the return spring 75 stretches. The rod 78 is displaced forwardly and the transmission brake lever 80 pivots to actuate the transmission brake (not shown) within the transmission T. The force-limiting spring 74 is not significantly compressed until the transmission brake is fully engaged and additional force is applied to the pedal 18.

A brake lock plate 84 is fixed on the brake shaft 68. The brake lock plate 84 includes a protrusion in the form of a short rod 86 that passes through the plate 84.

The cruise control handle 20 is connected to a linkage rod 104 that passes through a guide bracket 108 fixed to the vehicle frame. The linkage rod 104 is connected to a cruise control pawl 112 at a connection 113 on a front side of a pivot joint 114. The pawl 112 includes an engagement end 116 having a tooth 116*a* (shown in FIG. 4) that engages a toothed surface 122 of a block 124 that is fastened to the control arm 50. If the cruise control is engaged by actuation of the handle 20 by an operator, when a desired forward speed is reached, the pawl 112 will engage a corresponding tooth of the surface 122 corresponding to the desired speed. The position of the control arm 50 will be held until the cruise control is disengaged. Alternatively, the cruise control can be disengaged until the desired speed is reached and then manually engaged to engage the pawl 112 to the surface 122 to hold the desired speed. The block has a relatively smooth non-engageable region 123 corresponding to the positions of the control arm 50 for reverse speeds such that the pawl 112 of the cruise control cannot be engaged to the block 124 for reverse direction.

The brake actuator 21 is connected to a linkage rod 132 that passes through the guide bracket 108 and extends obliquely forwardly (FIG. 3) to be connected at a ball joint 134 to a latch member 140. The latch member 140 includes a latch arm 141 connected to a prone U-shaped base 142. The base 142 has a bolt 146 extended therethrough and which captures a portion of the vehicle frame (not shown) such that the base 142 is pivotally connected to the vehicle frame. The base 142 straddles a portion of the lock plate 84.

A cruise control disengage strap 147, a rigid member, passes through a slot 148 in the brake lock plate 84. The strap 147 is sized and configured to slide within the slot 148. As illustrated in FIG. 3A, the strap 147 is pivotally connected to the pawl 112 at the connection 113 and is captured in the slot 148 by a cap or head 149. If the cruise control pawl 112 is engaged to the surface 122 and the brake pedal 18 is then depressed, the lock plate 84 rotates while the strap 147, although stationary, slides relatively through the slot 148. Once the strap 147 contacts the top end of the slot 148, further depression of the brake pedal 18 exerts a downward force on the strap 147. The strap 147 is displaced downward pulling the pawl 112 downward to rotate about the pivot joint 114 to become disengaged from the block 124, i.e., disengaging the cruise control.

Returning to FIG. 3, the latch arm 141 includes a first notch 154 close to a distal end of the arm 141 and a second notch 158 located between the first notch 154 and the bolt 146. The notches 154, 158 are aligned with the protrusions 59, 86.

Figure 4:
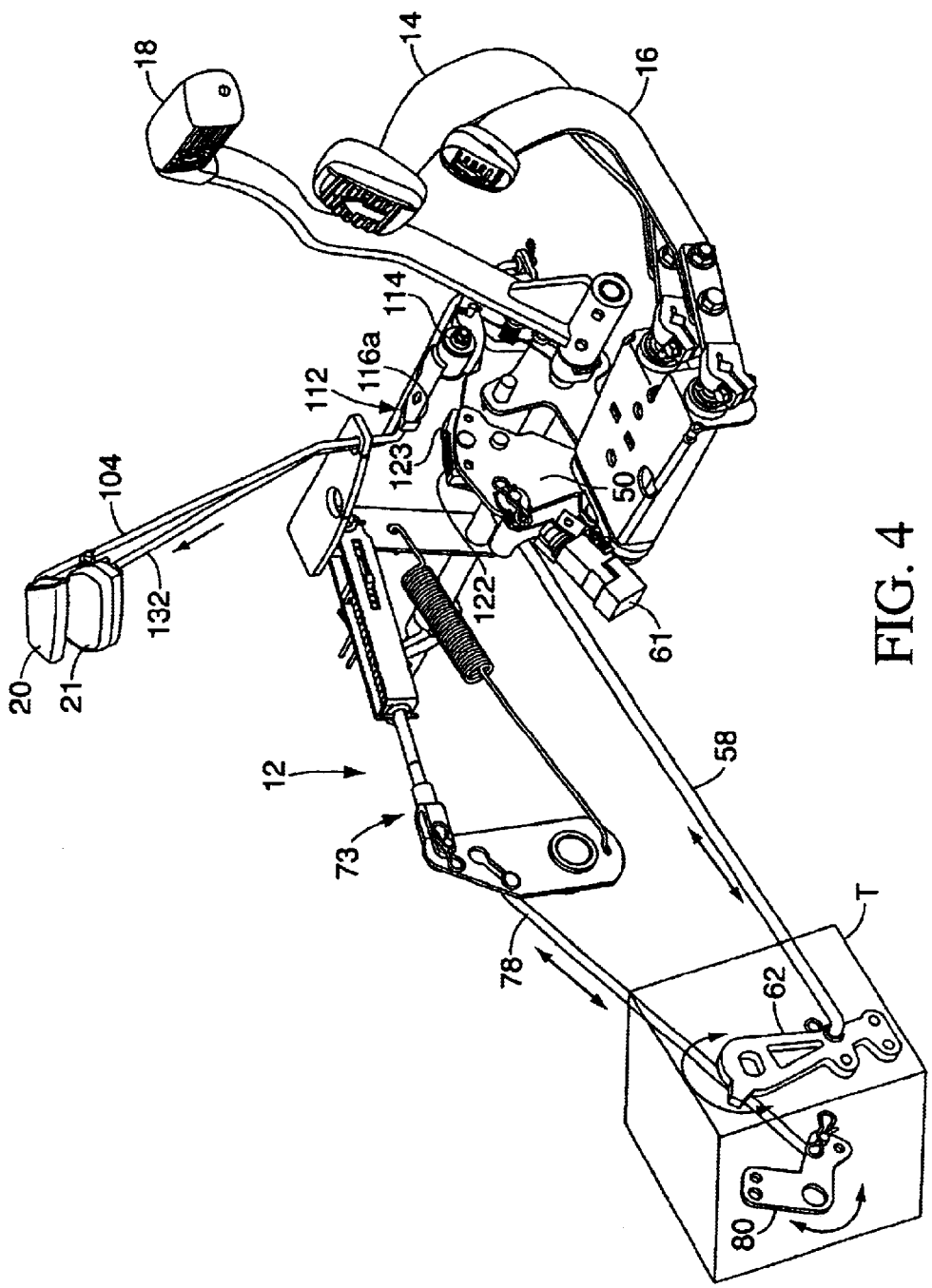
FIG. 4 is a partially schematic right side perspective view of the ground speed and direction control assembly of the lawn and garden tractor of FIG. 2, shown with the cruise control disengaged and the parking brake engaged.
Figure 5:
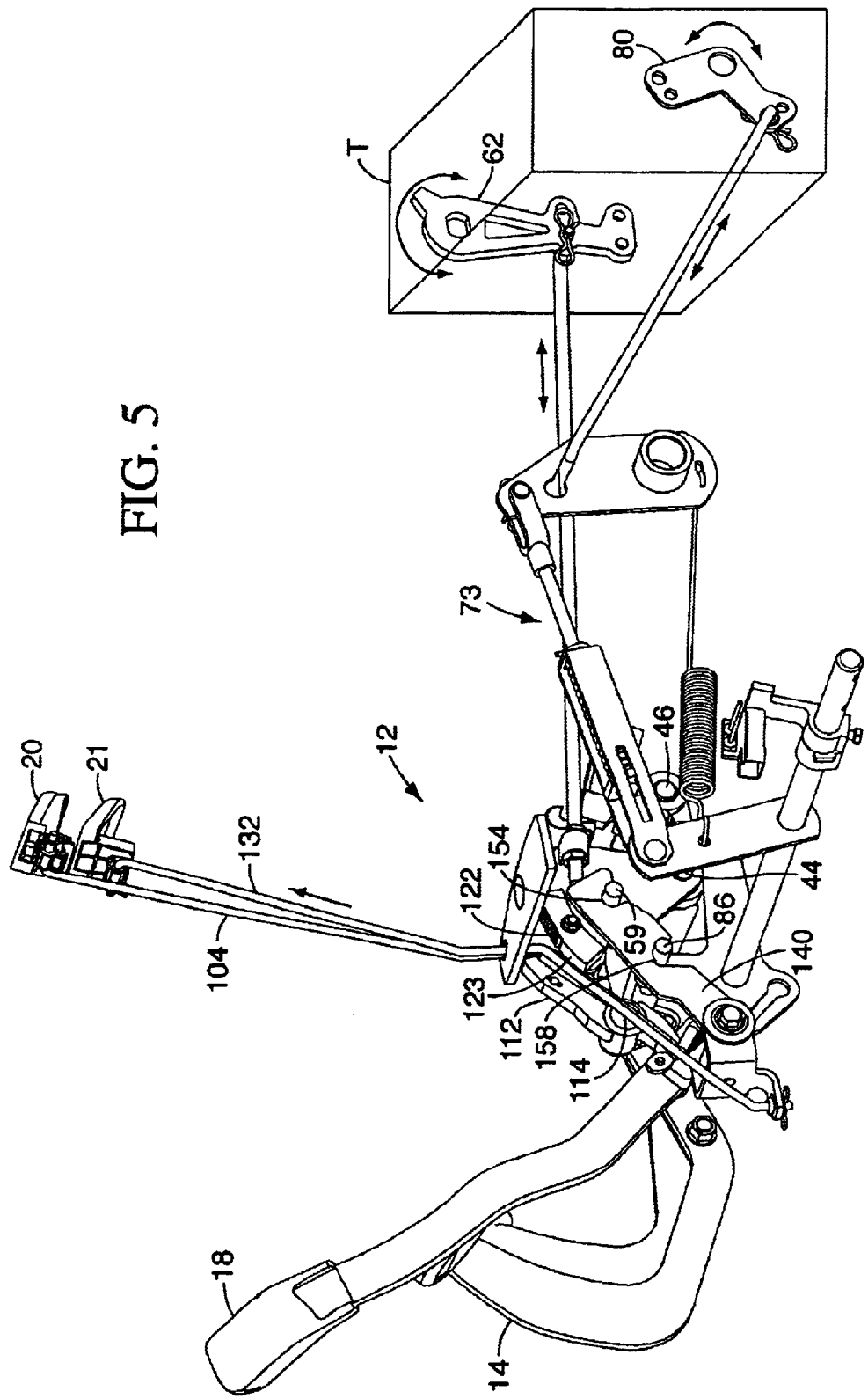
FIG. 5 is a left side partially schematic perspective view of the assembly of FIG. 4.

As illustrated in FIGS. 4 and 5, to activate the parking brake and transmission interlock of the invention, the brake pedal 18 is depressed by the operator and the handle 21 is pulled upward. If the cruise control handle 20 happens to be lifted, i.e., the cruise control engaged, the downward complete movement of the pedal 18 causes the strap 147 to pivot the pawl 112 to disengage the cruise control, i.e., by lifting the tooth 116*a*. The rod 104 and the handle 20 are pulled downward. The latch member 140 is pivoted clockwise (FIG. 5) and the notches 154, 158 capture the protrusions 59, 86. This locks the position of the lock plate 84 and the brake shaft 68 in the brake-engaged position and locks the control arm 50 in the neutral position, between the forward and reverse.

Thus, by actuating the parking brake mechanism, including the brake pedal 18 and the handle 21, the cruise control is automatically disengaged, the transmission brake is engaged, and the transmission is locked in neutral. The drive pedals 14, 16 are locked in the neutral position, rendered inoperative, and unable to initiate power transfer from the transmission while the transmission brake is engaged. Excessive wear on the transmission brake is thus avoided.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a vehicle having an engine that drives a hydrostatic transmission and having forward and reverse pedals that control the hydrostatic transmission, said vehicle having a parking brake that has a manually set portion to engage the parking brake, the improvement comprising:

an operator-actuated transmission locking mechanism that locks the forward and reverse pedals in a neutral position;

wherein said vehicle comprises a brake pedal and a movable portion actuated by an operator's foot pressing said brake pedal, said movable portion movable from a brake-disengaged position to a brake-engaged position, wherein said manually set portion comprises an engagement member having a pivot and a catch portion, wherein when said movable portion is in said brake-engaged position, said engagement member is operable to swing about said pivot to engage said catch portion with said movable portion to prevent retraction of said movable portion to the brake-disengaged position;

wherein said transmission locking mechanism is carried by said engagement member and swings into position about said pivot to lock said front and rear pedals.

2. The improvement according to claim 1, wherein said transmission locking mechanism is mechanically connected to said manually set portion such that said manually set portion and said transmission locking mechanism are actuated together.

3. The improvement according to claim 1, wherein said forward and reverse pedals are operatively connected to a pedal control arm such that said pedal control arm is pivoted in one direction by movement of said forward pedal and in an opposite, second direction by movement of said reverse pedal, and said pedal control arm comprises a protrusion, and said transmission locking mechanism is engageable to said protrusion to arrest movement of said pedal control arm.

4. The improvement according to claim 1, wherein said forward and reverse pedals are operatively connected to a pedal control arm such that said pedal control arm is pivoted one direction by movement of said forward pedal and in an opposite, second direction by movement of said reverse pedal, and said pedal control arm comprises a protrusion, and said transmission locking mechanism engageable to said protrusion to arrest movement of said pedal control arm.

5. The improvement according to claim 4, wherein said transmission locking mechanism is operatively connected to said manually set portion and is engaged to said protrusion simultaneously with the engagement of said parking brake.

6. In a vehicle having an engine that drives a hydrostatic transmission and having forward and reverse pedals that control the hydrostatic transmission, said vehicle having a parking brake that has a manually set portion to engage the parking brake, the improvement comprising:
    an operator-actuated transmission locking mechanism that locks the forward and reverse pedals in a neutral position;
    wherein said transmission locking mechanism is mechanically connected to said manually set portion such that said manually set portion and said transmission locking mechanism are actuated together;
    wherein said vehicle comprises a brake pedal and a moving portion actuated by an operator's foot pressing said brake pedal, said moving portion movable from a brake-disengaged position to a brake-engaged position, wherein said manually set portion comprises an engagement member having a pivoting end and a catch portion, wherein when said moving portion is in said brake-engaged position said engagement member is operable to pivot to engage said catch portion with said moving portion to prevent retraction of said moving portion to the brake-disengaged position;
    wherein said forward and reverse pedals are operatively connected to a pedal control arm such that said pedal control arm is pivoted in one direction by movement of said forward pedal and in an opposite, second direction by movement of said reverse pedal, and said pedal control arm comprises a protrusion, and said transmission locking mechanism is engageable to said protrusion to arrest movement of said pedal control arm;
    wherein said transmission locking mechanism is carried on said engagement member of said manually set portion and is engaged to said protrusion simultaneously with the engagement of said catch portion with said moving portion.

7. A vehicle parking system, comprising:
    a vehicle frame supported on a plurality of wheels;
    an engine driving a hydrostatic transmission, said engine and transmission supported on said frame, said transmission operatively connected to at least one of said wheels to drive said one wheel to drive said vehicle;
    an operator-actuated brake pedal operatively connected via a first moving part to at least one vehicle brake to engage said brake or to disengage said brake;
    operator-actuated forward and reverse pedals operatively connected via a second moving part to said hydrostatic transmission to control said hydrostatic transmission to selectively drive said vehicle in forward or reverse; and
    an operator-actuated parking brake actuator movable between a park mode and a release mode, said actuator operatively connected to a third moving part that swings about a pivot to arrest movement of said first and second moving parts when said actuator is moved from said release mode to said park mode.

8. The vehicle parking system according to claim 7, further comprising an operator-actuated cruise control selector that is operatively connected to a cruise control engagement device;
    wherein said second member comprises a rotational position fixing device, wherein when said cruise control selector is activated by an operator, said cruise control engagement device engages said rotation position fixing device to fix a rotational position of said second member.

9. The vehicle parking system according to claim 8, comprising a cruise control disengage member connected between said first member and said cruise control engagement device such that when said first member is moved a pre-selected amount, said disengage member moves said cruise control engagement device to disengage the cruise control engagement device from said rotational position fixing device.

10. A vehicle parking system, comprising:
    a vehicle frame supported on a plurality of wheels;
    an engine driving a hydrostatic transmission, said engine and transmission supported on said frame, said transmission operatively connected to at least one of said wheels to drive said one wheel to drive said vehicle;
    an operator-actuated brake pedal operatively connected via a first moving part to at least one vehicle brake to engage said brake or to disengage said brake;
    operator-actuated forward and reverse pedals operatively connected via a second moving part to said hydrostatic transmission to control said hydrostatic transmission to selectively drive said vehicle in forward or reverse; and
    an operator-actuated parking brake actuator movable between a park mode and a release mode, said actuator operatively connected to a third moving part that moves to arrest movement of said first and second moving parts when said actuator is moved from said release mode to said park mode;
    wherein said first moving part comprises a first member that swings with an actuation of said brake pedal, said first member having a first protrusion on a swinging portion of said first member;
    wherein said second moving part comprises a second member that swings in a first direction with an actuation of said forward pedal and in a second direction with an actuation of said reverse pedal, said second member having a second protrusion on a swinging portion thereof;
    wherein said third moving part comprises a latch arm having first and second slots, said latch arm configured to pivot upon actuation of said parking brake actuator causing said latch arm to swing with said first slot capturing said first protrusion and said second slot capturing said second protrusion, to arrest movement of said first and second members.

* * * * *